United States Patent
Van De Poel

(10) Patent No.: US 10,038,323 B2
(45) Date of Patent: Jul. 31, 2018

(54) METHOD AND CONTROLLER FOR DEVICE POWER STATE CONTROL

(71) Applicant: Thomson Licensing, Issy de Moulineaux (FR)

(72) Inventor: Dirk Van De Poel, AArtselaar (BE)

(73) Assignee: THOMSON Licensing, Issy-les-Moulineaux (FR)

( * ) Notice: Subject to any disclaimer, the term of this patent is extended or adjusted under 35 U.S.C. 154(b) by 673 days.

(21) Appl. No.: 13/770,997

(22) Filed: Feb. 19, 2013

(65) Prior Publication Data

US 2013/0214600 A1 Aug. 22, 2013

(30) Foreign Application Priority Data

Feb. 20, 2012 (EP) .................................. 12305189

(51) Int. Cl.
- *H02J 4/00* (2006.01)
- *H04N 21/443* (2011.01)
- *H04N 21/485* (2011.01)
- *G06F 1/32* (2006.01)

(52) U.S. Cl.
CPC .............. *H02J 4/00* (2013.01); *G06F 1/3215* (2013.01); *H04N 21/4436* (2013.01); *H04N 21/485* (2013.01); *Y10T 307/406* (2015.04)

(58) Field of Classification Search
CPC .... H02J 4/00; Y10T 307/406; H04N 21/4436; H04N 21/485; G06F 1/3215
See application file for complete search history.

(56) References Cited

U.S. PATENT DOCUMENTS

| | | | |
|---|---|---|---|
| 6,772,354 B2* | 8/2004 | Takenaka | H04B 1/205 713/300 |
| 7,509,510 B2* | 3/2009 | Berman | G06F 1/3209 370/241 |
| 8,447,999 B2* | 5/2013 | Sato | G06F 1/3215 348/333.13 |

(Continued)

FOREIGN PATENT DOCUMENTS

| CN | 1729686 | 2/2006 |
|---|---|---|
| CN | 201118738 | 9/2008 |

(Continued)

OTHER PUBLICATIONS

Anonymous, "SCART-W ikipedia, the free encyclopedia", http://en.wikipedia.org/wiki/SCART, Jan. 22, 2014, pp. 1-16.

(Continued)

*Primary Examiner* — Zeev V Kitov

(74) *Attorney, Agent, or Firm* — Brian J. Dorini; Joseph J. Opalach

(57) ABSTRACT

A method and a controller for power state control of a device that is connected to two or more other devices are described. Also described are a method and a controller for configuring the power state control. Power states of related devices among the two or more other devices are monitored. In case all related devices among the two or more other devices are in a low power mode, the device is switched to a low power mode. Alternatively, in case all related devices among the two or more other devices are in a low power mode, the device is switched to a normal power mode. Which of the other devices are related devices is determined in a configuration procedure.

20 Claims, 4 Drawing Sheets

(56) References Cited

U.S. PATENT DOCUMENTS

| | | | |
|---|---|---|---|
| 2001/0029587 A1 | 10/2001 | Takenaka et al. | |
| 2005/0125829 A1 | 6/2005 | Ozaki | |
| 2006/0109384 A1 | 5/2006 | Miller-Smith et al. | |
| 2006/0224908 A1 | 10/2006 | Aizawa | |
| 2009/0083560 A1* | 3/2009 | O'Connell | G06F 1/3209 |
| | | | 713/323 |
| 2009/0109485 A1 | 4/2009 | Yoshida | |
| 2010/0246866 A1* | 9/2010 | Swain | H04R 25/505 |
| | | | 381/315 |
| 2011/0047394 A1 | 2/2011 | Sato | |
| 2011/0124375 A1 | 5/2011 | Stuivenwold | |

FOREIGN PATENT DOCUMENTS

| | | |
|---|---|---|
| CN | 101409809 | 4/2009 |
| CN | 201758421 | 3/2011 |
| CN | 102065261 | 5/2011 |
| CN | 201065261 | 5/2011 |
| CN | 102084317 | 6/2011 |
| CN | 102340150 | 2/2012 |
| JP | 2000141831 | 5/2000 |
| JP | 2001353929 | 12/2001 |
| JP | 20041241 | 1/2004 |
| JP | 2007108862 | 4/2007 |
| JP | 2009107167 | 5/2009 |
| JP | 2009282816 | 12/2009 |
| JP | 2009296357 | 12/2009 |
| JP | 2011194749 | 10/2011 |
| WO | WO2004057862 | 7/2004 |

OTHER PUBLICATIONS

Philips, "User Manual TV Set 42PFL9703", Jul. 16, 2008, pp. 1-68.
Anonymous, "UPnP Low Power Architecture, for UPnP-V1": UPnP FORUM, Aug. 28, 2007,Document Version: 1.00, pp. 1-44.
European Search Report dated Jul. 2, 2012.

* cited by examiner

METHOD AND CONTROLLER FOR DEVICE POWER STATE CONTROL

This application claims the benefit, under 35 U.S.C. § 119 of EP Patent Application 12305189.8, filed 20 Feb. 2012.

FIELD OF THE INVENTION

The present invention relates to a method and a controller for device power state control. More specifically, a method and a controller are described, which control when to set a device to low power mode.

BACKGROUND OF THE INVENTION

In order to minimize power consumption an ever increasing number of devices support low power modes or standby states. Although there are existing mechanisms for a device to awake from a low power mode, e.g. the so called "wake on lan", UPnP low power, a user interaction with the device, etc., the logic for when to set a device to a low power mode is not yet defined in a standardized manner.

In current implementations devices will automatically determine when to go to low power mode, e.g. based upon activity detection, or will allow the end-user to configure when to go to low power mode based upon time-schedules. Unfortunately, automatic detection of when to go to low power state is a challenge because of the unpredictable human behavior. A priori scheduling of low power mode, e.g. based upon time ranges, will often be useful. However, as usage of home network appliances does not follow a strict schedule, scheduling will not always be a suitable option.

SUMMARY OF THE INVENTION

It is an object of the present invention to propose an improved solution for device power state control.

According to a first aspect of the invention, this object is achieved by a method for controlling a power state of a device, the device being connected to two or more other devices, the method comprising the steps of:
monitoring power states of related devices among the two or more other devices; and
in case all related devices among the two or more other devices are in a low power mode, switching the device to a low power mode.

Similarly, a controller for controlling a power state of a device, the device being connected to two or more other devices, is configured to perform the steps of:
monitoring power states of related devices among the two or more other devices; and
in case all related devices among the two or more other devices are in a low power mode, switching the device to a low power mode.

The invention makes use of the fact that in practice there are dependency relations between connected devices. For example, in order to watch IPTV on a TV the set top box needs to be powered on. In other words, the TV is a related device for the set top box, and vice versa. When only the TV depends on the set top box, the set top box can enter a low power mode whenever the TV is in a low power mode or powered off. Likewise, when the set top box is the only related device of the TV, the TV can enter a low power mode whenever the set top box is in a low power mode or powered off. The necessary information about related devices is preferably retrieved from a memory. For monitoring the power states of the related devices several solutions are available, e.g. monitoring protocol messages or handshakes and active probing.

The above configuration is best described as a parallel power configuration. In this configuration the device remains in normal power mode as long as any of the related devices is in normal power mode, and switches to low power mode when all related devices are in low power mode.

Favorably, when the device is in the low power mode, it permanently or repeatedly monitors whether a related device among the two or more other devices enters a normal power mode. Once this happens, the device also switches to a normal power mode. This ensures that the device is automatically switched on again when any of the related devices is switched on.

According to a further aspect of the invention, this object is also achieved by a method for controlling a power state of a device, the device being connected to two or more other devices, the method comprising the steps of:
monitoring power states of related devices among the two or more other devices; and
in case all related devices among the two or more other devices are in a low power mode, switching the device to a normal power mode.

Similarly, a controller for controlling a power state of a device, the device being connected to two or more other devices, wherein the controller is configured to perform the steps of:
monitoring power states of related devices among the two or more other devices; and
in case all related devices among the two or more other devices are in a low power mode, switching the device to a normal power mode.

This further configuration can be described as an opposite power configuration. In this configuration the device remains in low power mode as long as any of the related devices is in normal power mode, and switches to normal power mode when all related devices are in low power mode. For example, if normally either the TV and a set top box for TV reception or the network radio are powered on, the network radio would go into normal power mode when it detects that the TV and the set top box are powered off. If a device has only a single related device, the configuration can also be described as a mutually exclusive power configuration, i.e. the device goes to normal power mode when the related device enters low power mode, and vice versa.

Favorably, when the device is in the normal power mode, it permanently or repeatedly monitors whether a related device among the two or more other devices enters a normal power mode. Alternatively or in addition, the device may be notified about other devices entering normal power mode, e.g. by UPnP SSDP advertisements of devices powering on and off (UPnP: Universal Plug and Play; SSDP: Simple Service Discovery Protocol). Once this happens, the device switches to a low power mode. This ensures that the device is automatically switched off again when any of the related devices is switched on.

For instance, coming back to the above example, the network radio would enter normal power mode again when either the TV or the set top box are powered on.

In order to allow end-users to determine a dependency of a device power state on other device power states during installation or (re)configuration, a method for configuring a power state control of a device, the device being connected to one or more other devices, comprises the steps of:

activating a power state configuration mode;
detecting which of the one or more connected other devices are in a normal power mode;
terminating the power state configuration mode; and
storing those devices which have been detected as being in a normal power mode as related devices in a memory.

Similarly, a controller for configuring a power state control of a device, the device being connected to one or more other devices, is configured to perform the steps of:
activating a power state configuration mode;
detecting which of the one or more connected other devices are in a normal power mode;
terminating the power state configuration mode; and
storing those devices which have been detected as being in a normal power mode as related devices in a memory.

For configuring the power state control the end-user is asked to power on any devices on which this device power state depends, if necessary with a power off and on cycle. This in practice means that this device provides services to the others and does not need to be functional as long as there are no consumers, i.e. no related devices. If devices are detected to appear during the power state configuration mode, the configured device will go to low power mode when all devices that were discovered are either powered off or in low power mode. The above configuration method is thus performed for a parallel power configuration.

Of course, it is likewise possible to modify the configuration method in such way that the user is requested to switch on all devices that shall bring the device to low power mode. In this case, if devices are detected to appear during the power state configuration mode, the configured device will go to low power mode when any device that was discovered is either powered on or in normal power mode. This configuration method is thus performed for an opposite power configuration.

Alternatively, a method for configuring a power state control of a device, the device being connected to one or more other devices, comprises the steps of:
activating a power state configuration mode;
detecting which of the one or more connected other devices are in a low power mode;
terminating the power state configuration mode; and
storing those devices which have been detected as being in a low power mode as related devices in a memory.

Similarly, a controller for configuring a power state control of a device, the device being connected to one or more other devices, is configured to perform the steps of:
activating a power state configuration mode;
detecting which of the one or more connected other devices are in a low power mode;
terminating the power state configuration mode; and
storing those devices which have been detected as being in a low power mode as related devices in a memory.

Especially for configuring an opposite power configuration it might be more suitable to ask the user to switch off those devices which shall bring the device to low power mode. In this case, if devices are detected that are switched off or set to low power mode during the power state configuration mode, the configured device will go to low power mode when any device that was discovered is either powered on or in normal power mode.

Preferably, only those connected other devices are stored in a memory, which are in a normal power mode or in a low power mode, respectively, for at least a specified period of time. This helps to avoid false positives, i.e. device that where accidentally switched on or off during the power state configuration mode. Also, the power state configuration mode is favorably automatically terminated after expiration of a power state configuration mode time window. This frees the user from having to manually terminate the power state configuration mode.

The proposed configuration methods, which typically need only performed once, give the end-user the control over the dependencies of device power states based upon his or her preferences and habits.

The invention offers a number of significant advantages. To begin with, it is usable in combination with any other existing low power mode solution and constitutes just one of different criteria for a device to decide to enter low power mode or normal power mode. Still, it provides users the option to make devices behave like they expect them to and create power state dependencies that cannot be automatically determined. Furthermore, the configuration of the power mode dependency requires only a very basic mechanism (just some physical interaction) without the need to go through complex or lengthy configuration processes using device user interfaces. Because the solution does not rely upon a device user interface, it can be applied to any device or appliance provided that the power state dependency mode can be triggered or initiated with an indication of the power state configuration mode being active.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined or modified without departing from the scope of the present invention as defined in the appended claims. In the figures:

DETAILED DESCRIPTION OF PREFERRED EMBODIMENTS

Figure 1:
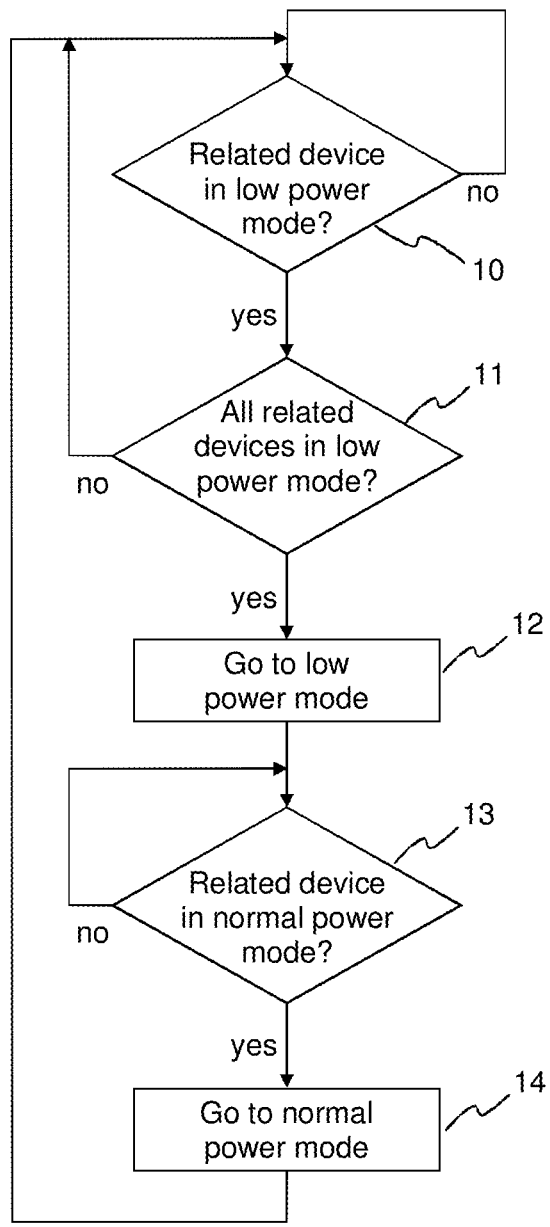
FIG. 1 schematically illustrates a method according to the invention for device power state control.

FIG. 1 schematically illustrates a method according to the invention for device power state control. A device permanently or repeatedly checks 10 whether another device it depends upon has been switched off or gone to a low power mode. If this is the case, it is determined 11 whether there is any related device left, which is not off or in low power mode. Once it is detected that all of the related devices are either off or in low power mode, the device also enters 12 low power mode. In this low power mode, the device monitors 13 whether any of the related devices is switched on again or awakes from the low power mode. Once this occurs, the device switches 14 to normal power mode again.

The invention makes use of the fact that in practice there are dependency relations between connected devices. For example, in order to watch IPTV on a TV the set top box needs to be powered on. In other words, the TV is a related device for the set top box, and vice versa. When only the TV depends on the set top box, the set top box can enter a low power mode whenever the TV is in a low power mode or powered off. Likewise, when the set top box is the only related device of the TV, the TV can enter a low power mode whenever the set top box is in a low power mode or powered off.

Different mechanisms may be used for detecting the power states of other devices. Examples of such mechanisms are: UPnP SSDP advertisements of devices powering on and off (UPnP: Universal Plug and Play; SSDP: Simple Service Discovery Protocol); UPnP Low Power (see: http://upnp.org/specs/lp/lp1/); Passive discovery based upon DHCP messages (DHCP: Dynamic Host Configuration Protocol); Active and periodic probing, e.g. using ARP messages, to detect whether a device is currently active (ARP: Address Resolution Protocol).

Figure 2:
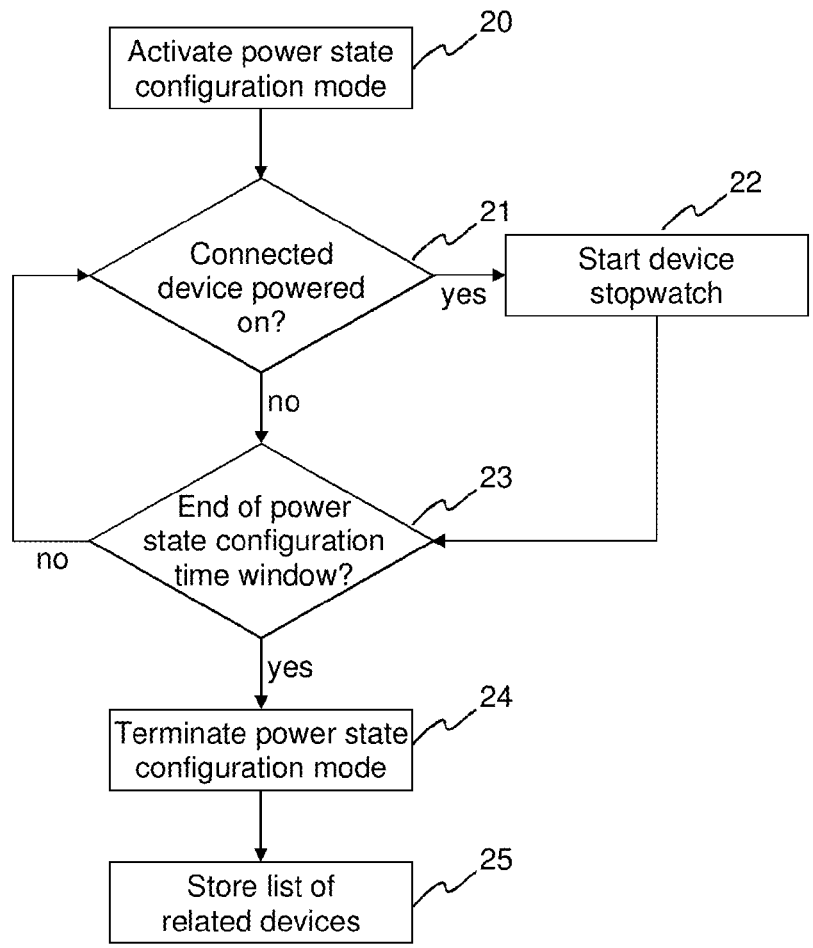
FIG. 2 schematically depicts a method according to the invention for configuring device power state control.

In order to make use of the dependency relations between connected devices, the device power state control needs to be configured. An exemplary method for configuring device power state control is depicted in FIG. 2. During a device installation phase or triggered by the end-user, a power state configuration mode is activated 20. The user may be able to trigger this mode, for example, by pressing a physical button on the device. The current device mode is preferably indicated to the user via a device user interface or using an LED light indication, such as flashing of a power saving light. During a power state configuration mode time window $t_{dm}$, the user powers on or power cycles the devices residing in the home network that are related to the device which is being configured. The device permanently or repeatedly checks 21 whether any connected device is powered on. Of course, it is likewise possible to power the related device on before initiating the power state configuration mode. In this case the device checks 21 whether any connected device is in a normal power mode. In any case, if such a connected device is discovered, advantageously a stopwatch for the discovered device is started 22, which determines whether the device remains powered on for a specified period of time $t_d$. In this way false-positives, i.e. devices that are accidentally powered on, can be avoided by powering these devices off again. This period of time $t_d$ starts from the first discovery of the device and may last even longer than the power state configuration mode. Of course, the power state configuration can likewise be performed without specifying a minimum period of time $t_d$. When it is determined 23 that the power state configuration mode time window has lapsed, the power state configuration mode is terminated 24. Those discovered devices, which remained powered on for at least the specified period of time $t_d$, are saved 25 in a list of related devices.

Again, different mechanisms may be used for detecting the power on of connected devices. Examples of such mechanisms are: UPnP SSDP messages; DHCP discover messages; HDMI handshakes (HDMI: High Definition Multimedia Interface); ARP messages mDNS messages (mDNS: Multicast Domain Name Service).

Figure 3:
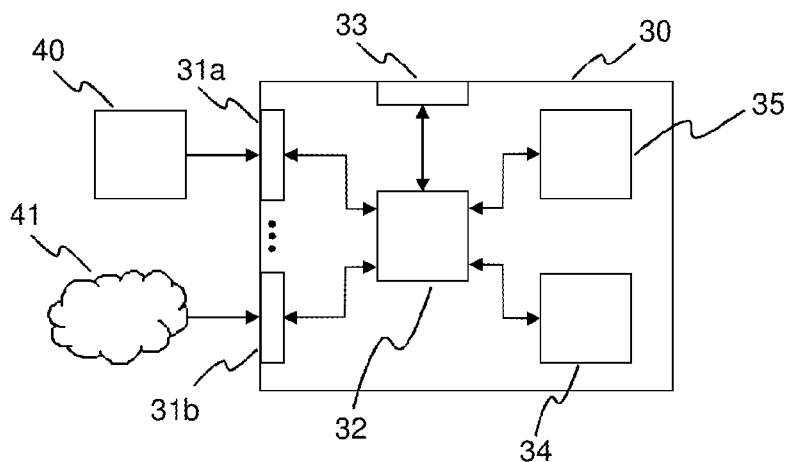
FIG. 3 illustrates an apparatus configured to implement the methods of FIGS. 1 and 2.

An apparatus 30 configured to implement the methods of FIGS. 1 and 2 is schematically illustrated in FIG. 3. The apparatus 30 comprises one or more interfaces 31a, 31b, ... for connecting other devices 40, either individually or via a network 41. A controller 32 monitors the power modes of the connected devices 40 and controls the power mode of the apparatus 30. When a user initiates a power state configuration mode via a user interface 33, the controller 32 checks for any connected device 40 that is powered on and starts a stopwatch 34 for each detected device 40 to determine the related devices. At the end of the power state configuration, information about all detected related devices is stored in a memory 35.

In the following two examples for an implementation of the present invention shall be given. According to the first example a user installs a set top box (STB) at home. As part of the installation process the device enters a power state configuration mode, which is indicated via an LED light or a display message. During the STB power state configuration mode time window, e.g. 3 minutes, the TV is powered on and discovered by the STB for a period of time, e.g. via HDMI. The power state configuration mode time window expires and the TV is the only discovered device. Subsequently, whenever the TV enters a low power mode, e.g. "standby", due to either end-user interaction via a remote control or a sleep timer expiration, the STB will also automatically enter low power mode.

Another example is a similar process, where a digital media server, e.g. a DLNA DMS, supports a power state configuration mode. During this mode the digital media server discovers a STB and a network radio, which can stream music from the Internet and from the local digital media server. Whenever the digital media server detects that both the STB and the network radio are in low power mode or powered off, it also enters a low power mode. As soon as either the STB or the network radio become active again, the digital media server powers on because either the STB or the network radio may use the digital media server to stream media.

Figure 4:
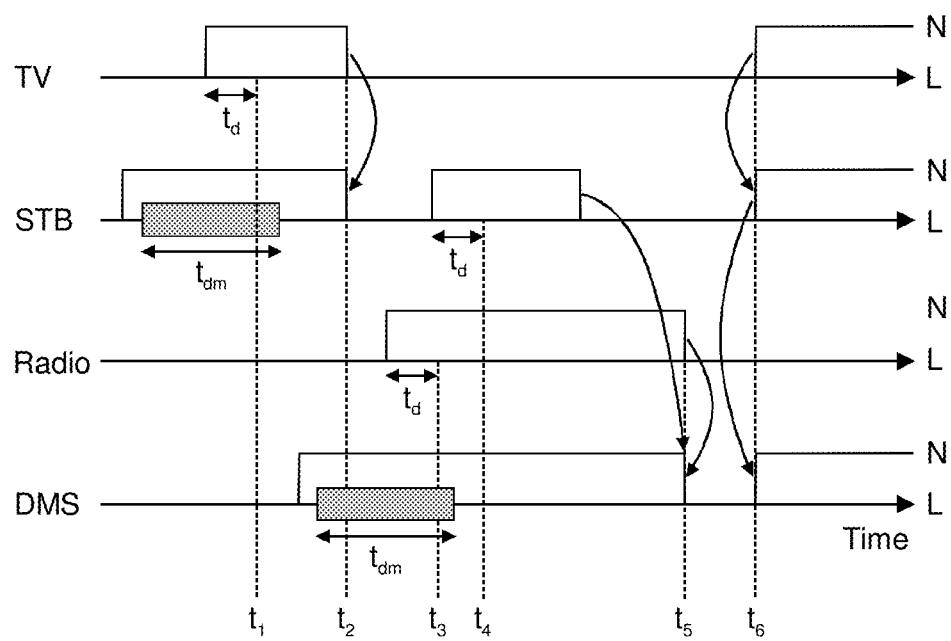
FIG. 4 depicts an exemplary scenario realized using the methods of FIG. 1 and FIG. 2.

FIG. 4 illustrates a scenario where four devices reside in a home network, namely a TV, a set top box (STB), a network radio, and a digital media server (DMS). In the figure, the power modes 'normal mode N' and 'low power mode L' of the devices are plotted against time. During its power state configuration mode the STB discovers only the TV at $t_1$. It will thus automatically go to low power mode as soon as the TV is either in low power mode or powered off at $t_2$. The DMS provides media content, e.g. music, movies and pictures, to the STB and to the network radio. During its power state configuration mode the DMS discovers both the network radio at $t_3$ and the STB at $t_4$. It will thus automatically enter low power mode as soon as both the STB and the network radio are either in low power mode or powered off at $t_5$. When the user activates the TV at $t_6$, e.g. using a remote control, the STB will automatically power on. This in turn triggers the DMS to power on so that the user can start watching movies or pictures that are on the DMS.

Figure 5:
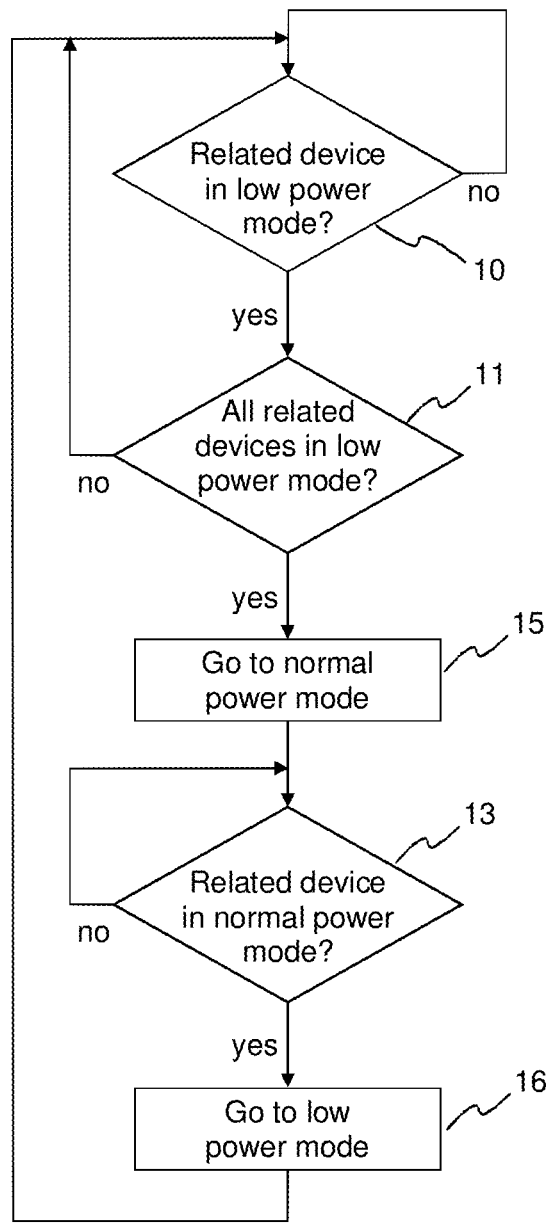
FIG. 5 schematically illustrates a method according to the invention for device power state control in case of an opposite power mode.

A variant of the present invention is to use the same configuration and discovery mechanism for a power state control in which a device will automatically select an "opposite" power mode. For example, if normally either the TV or the network radio are powered on (mutually exclusive), the TV would go into low power mode when it detects that the network radio is powered on, and would enter normal power mode again when the network radio is powered off. This variant is schematically illustrated in FIG. 5. The device permanently or repeatedly checks 10 whether another device it depends upon has been switched off or gone to a low power mode. If this is the case, it is determined 11 whether there is any related device left, which is not off or in low power mode. If the device only has a single related device, this determining step 11 can be omitted. Once it is detected that all of the related devices are either off or in low power mode, the device enters 15 a normal power mode. In this normal power mode, the device monitors 13 whether any of the related devices is switched on again or awakes from the low power mode. Once this occurs, the device switches 16 to low power mode again.

What is claimed is:

1. A method for controlling a power state of a device switchable between a low power mode and a normal power mode, the device being connected to two or more other devices, the method comprising:
   when in the normal power mode, monitoring power states of related devices among the two or more other devices;
   responsive to all of the related devices among the two or more other devices being in the low power mode, switching the device to the low power mode;
   in the low power mode, monitoring whether a related device among the two or more other devices enters the normal power mode; and
   responsive to the related device among the two or more other devices entering the normal power mode, switching the device to the normal power mode.

2. A method for controlling a power state of a device switchable between a low power mode and a normal power mode, the device being connected to two or more other devices, the method comprising:
   when in the low power mode, monitoring power states of related devices among the two or more other devices; and
   responsive to all of the related devices among the two or more other devices being in the low power mode, switching the device to the normal power mode.

3. The method according to claim 2, further comprising:
   in the normal power mode, monitoring whether a related device among the two or more other devices enters the normal power mode; and
   responsive to the related device among the two or more other devices entering the normal power mode, switching the device to the low power mode.

4. The method according to claim 1, wherein information about the related devices is retrieved from a memory.

5. The method according to claim 1, wherein the power states of the related devices among the two or more other devices are monitored using at least one of monitoring protocol messages or handshakes and active probing.

6. A method for configuring a power state control of a device, the device being connected to two or more other devices, the method comprising:
   activating a power state configuration mode;
   detecting which of the two or more connected other devices are in a normal power mode;
   terminating the power state configuration mode; and
   storing those devices which have been detected as being in the normal power mode as related devices in a memory, wherein the power state control is configured to switch the device to a low power mode when all of the related devices are in the low power mode or to switch the device to the low power mode when one or more of the related devices are in the normal power mode.

7. A method for configuring a power state control of a device, the device being connected to two or more other devices, the method comprising:
   activating a power state configuration mode;
   detecting which of the two or more connected other devices are in a low power mode;
   terminating the power state configuration mode; and
   storing those devices which have been detected as being in the low power mode as related devices in a memory, wherein the power state control is configured to switch the device to the low power mode when one or more of the related devices are in the normal power mode.

8. The method according to claim 6, wherein only those connected other devices are stored in the memory, which are in the normal power mode or in the low power mode, respectively, for at least a specified period of time.

9. The method according to claim 6, wherein the detecting which of the two or more connected other devices are in the normal power mode or in the low power mode uses at least one of monitoring protocol messages or handshakes and active probing.

10. The method according to claim 6, wherein the power state configuration mode is automatically terminated after expiration of a power state configuration mode time window.

11. A controller for controlling a power state of a device switchable between a low power mode and a normal power mode, the device being connected to two or more other devices, wherein the controller is configured to:
    when in the normal power mode, monitor power states of related devices among the two or more other devices;
    responsive to all of the related devices among the two or more other devices being in low power mode, switch the device to the low power mode;
    in the low power mode, monitor whether a related device among the two or more other devices enters the normal power mode; and
    responsive to a related device among the two or more other devices entering the normal power mode, switch the device to the normal power mode.

12. A controller for controlling a power state of a device switchable between a low power mode and a normal power mode, the device being connected to two or more other devices, wherein the controller is configured to:
    when in the low power mode, monitor power states of related devices among the two or more other devices; and
    responsive to all of the related devices among the two or more other devices being in the low power mode, switch the device to the normal power mode.

13. A controller for configuring a power state control of a device, the device being connected to two or more other devices, wherein the controller is configured to:
    activate a power state configuration mode;
    detect which of the two or more connected other devices are in a low power mode;
    terminate the power state configuration mode; and
    store those devices which have been detected as being in the normal power mode as related devices in a memory, wherein the power state control is configured to switch the device to the low power mode when all of the related devices are in the low power mode or to switch the device to the low power mode when one or more of the related devices are in the normal power mode.

14. A controller for configuring a power state control of a device, the device being connected to two or more other devices, wherein the controller is configured to:
    activate a power state configuration mode;
    detect which of the two or more connected other devices are in a low power mode;
    terminate the power state configuration mode; and
    store those devices which have been detected as being in the low power mode as related devices in a memory, wherein the power state control is configured to switch the device to the low power mode when one or more of the related devices are in the normal power mode.

15. The controller according to claim 12, wherein the controller is configured to:

in the normal power mode, monitor whether a related device among the two or more other devices enters the normal power mode; and responsive to the related device among the two or more other devices entering the normal power mode, switch the device to the low power mode.

16. The controller according to claim 11, wherein the controller is configured to retrieve information about the related devices from a memory.

17. The controller according to claim 11, wherein the controller is configured to monitor the power states of the related devices among the two or more other devices using at least one of monitoring protocol messages or handshakes and active probing.

18. The controller according to claim 13, wherein the controller is configured to store only those connected other devices in the memory, which are in the normal power mode or in the low power mode, respectively, for at least a specified period of time.

19. The controller according to claim 13, wherein the controller is configured to use at least one of monitoring protocol messages or handshakes and active probing for detecting which of the two or more connected other devices are in the normal power mode or in the low power mode.

20. The controller according to claim 13, wherein the controller is configured to automatically terminate the power state configuration mode after expiration of a power state configuration mode time window.

* * * * *